UNITED STATES PATENT OFFICE.

JAMES M. WILLCOX, OF GLEN MILLS, PENNSYLVANIA.

IMPROVEMENT IN PAPER FOR BANK-NOTES, BONDS, &c.

Specification forming part of Letters Patent No. 115,005, dated May 16, 1871.

*To all whom it may concern:*

Be it known that I, JAMES M. WILLCOX, of Glen Mills, in the county of Delaware and State of Pennsylvania, have invented a new and useful Improvement in Chameleon or Combined Sensitive and Special Paper; and I do hereby declare that the following is a full, clear, and exact description thereof, which will enable others skilled in the art to make and use the same.

My invention has for its object to furnish an improved paper sensitive to the action of acids, alkalies, ammonia, and other chemicals competent to remove ink from paper in such a way as to betray tampering with figures, letters, or designs written, printed, or drawn upon it, and which shall be distinguishable from other paper by the specific effects of different chemicals acting upon two or more different coloring-matters in or upon the paper, for the purpose of guarding against alterations and against the substitution for any purpose of a paper apparently but not really similar to the genuine; and it consists in the paper prepared as hereinafter more fully described.

The paper is colored or tinted with two or more coloring or tinting substances, of which at least one color or tint is differently sensitive to some chemicals from one or more of the outer coloring or tinting substances.

The coloring or tinting substances are applied by saturating the paper with them, or by coloring or tinting its surface, or (which is preferable) by mixing them with the paper-pulp before making it into paper.

If desired, one or more of the colors or tints may be in the body of the paper and one or more upon its surface.

The paper thus prepared is both sensitive and special, and is designed to protect against fraud by both qualities—that is to say, through its sensitiveness it protects against the alteration of a genuine instrument, and through its specialty it protects against the substitution of an imitation for a genuine instrument.

The peculiarity of the specialty is to be determined by the certain different effects of different chemicals upon one or more of the different coloring or tinting substances used, or by the different effect of one chemical upon the different colors or tints in the same paper when said colors or tints may be differently sensitive to that chemical.

To illustrate the subject practically, showing how, by my invention, tertiary colors are obtained or developed, suppose the paper to be tinted with a red color sensitive under an acid, a blue sensitive under an alkali, and a yellow permanent under both. Then, if acid be applied to the paper, the red will be discharged and a green color formed from the union of blue and yellow. On the other hand, if an alkali be used, the blue will be discharged and an orange formed. When this has been done, by using opposite reagents one or the other of the original colors will be made to appear.

Other sensitive papers simply discharge their colors in substantially the same manner when acted upon by different chemical agents for the purpose of protecting a genuine instrument against alteration without regard to any specific chemical action further than a change of original color or colors, and without regard to any special colors as the result of special chemical agents.

In my improved paper I aim at obtaining special colors as the results of special agents. For example, if the tint is made by combining in the paper-pulp a red color that is sensitive to acids and alkalies, and scarcely at all sensitive to aqua ammonia, and a blue color that is not sensitive to acids, but is sensitive to alkalies and ammonia and differently sensitive to each, and the paper thus prepared is subjected to acid, alkalies, or ammonia to discharge a figure, letter, or word to effect a fraud, or is subjected to any other chemical agent likely to be used for such a purpose, the original tint of the paper will be changed so as to betray the attempt.

This simple result is obtainable with other sensitive papers; but with the sample of my improved paper described above as an example, if the attempt is made with acid the red will be discharged and the paper will become a greenish blue. If the attempt is made with strong alkali, both colors will be discharged and the paper will become whitish. If the attempt is made with a weak alkali, the blue, being more sensitive to its action than the red, will be discharged first, and the paper will become red. Ammonia would likewise discharge the blue and not the red, except under a severe trial. Such results would determine the paper to be a special paper, whose genuineness could be tested by special chemical tests.

Having thus described my invention, I claim as new and desire to secure by Letters Patent—

A combined sensitive and special paper, prepared substantially in the manner herein described, and for the purposes set forth.

JAMES M. WILLCOX.

Witnesses:
  DARWIN PAINTER,
  CHARLOTTE S. SHEAFF.